US010532866B2

(12) United States Patent
Teague

(10) Patent No.: US 10,532,866 B2
(45) Date of Patent: Jan. 14, 2020

(54) CONTAINER CAP ASSEMBLY

(71) Applicant: Braxton Teague, Marshfield, MO (US)

(72) Inventor: Braxton Teague, Marshfield, MO (US)

( * ) Notice: Subject to any disclaimer, the term of this patent is extended or adjusted under 35 U.S.C. 154(b) by 14 days.

(21) Appl. No.: 15/941,653

(22) Filed: Mar. 30, 2018

(65) Prior Publication Data
US 2018/0282032 A1 Oct. 4, 2018

Related U.S. Application Data

(60) Provisional application No. 62/478,770, filed on Mar. 30, 2017.

(51) Int. Cl.
| | |
|---|---|
| *B65D 51/28* | (2006.01) |
| *A47J 31/00* | (2006.01) |
| *A47G 19/22* | (2006.01) |
| *B65D 47/08* | (2006.01) |
| *B01F 13/00* | (2006.01) |
| *A47J 31/40* | (2006.01) |
| *B65D 85/804* | (2006.01) |
| *B65D 43/02* | (2006.01) |

(52) U.S. Cl.
CPC ..... *B65D 51/2821* (2013.01); *A47G 19/2205* (2013.01); *A47J 31/005* (2013.01); *A47J 31/407* (2013.01); *B01F 13/0022* (2013.01); *B65D 47/08* (2013.01); *B65D 43/0231* (2013.01); *B65D 85/8043* (2013.01)

(58) Field of Classification Search
CPC ........ A47J 31/407; A47J 43/27; A47J 31/005; B65D 51/2821; B65D 85/804; B65D 85/8043; B65D 85/8085; B01F 13/0022

USPC ........................................................ 215/222
See application file for complete search history.

(56) References Cited

U.S. PATENT DOCUMENTS

| | | | |
|---|---|---|---|
| 8,777,044 B1 * | 7/2014 | Raymus ............. | A47G 19/2272 215/12.1 |
| 2008/0078200 A1 * | 4/2008 | Roth .................... | A47J 36/2416 62/457.4 |
| 2008/0105130 A1 * | 5/2008 | Koeling ................ | A47J 31/407 99/279 |
| 2009/0194533 A1 * | 8/2009 | Lizerbram ........... | B65D 47/243 220/212 |
| 2009/0261000 A1 * | 10/2009 | Epp .................... | B65D 51/2821 206/222 |
| 2010/0258457 A1 * | 10/2010 | Seelhofer ........... | B65D 51/2821 206/222 |
| 2011/0278185 A1 * | 11/2011 | Aguadisch ......... | B65D 81/3255 206/222 |

(Continued)

*Primary Examiner* — Mollie Impink
(74) *Attorney, Agent, or Firm* — Husch Blackwell LLP

(57) ABSTRACT

A shaker cup is provided that allows a user choose when to blend a mix, within a pod, with a liquid. The shaker cup includes a lid which has a spout. The shaker cup includes a container which has a reservoir, which is able to hold a liquid. The shaker cup may have a pod placed within, which is sized and shaped to allow the liquid to flow from the reservoir around the pod, and through the spout. The shaker cup also includes a pod holder which has a pod holder mechanism that, in a first position, allows the pod holder to selectively retain the pod or, in a second position, release the pod. The pod holder further includes an actuating mechanism for selectively allowing the pod holder to move between its first and second positions. The container is able to selectively engage with the lid.

19 Claims, 5 Drawing Sheets

(56) References Cited

U.S. PATENT DOCUMENTS

2015/0250349 A1\* 9/2015 Ng ........................ A47J 43/27
 215/227
2017/0129665 A1\* 5/2017 Rolfes ................ B65D 51/2821
2019/0021474 A1\* 1/2019 Resic .................. B65D 1/0292

\* cited by examiner

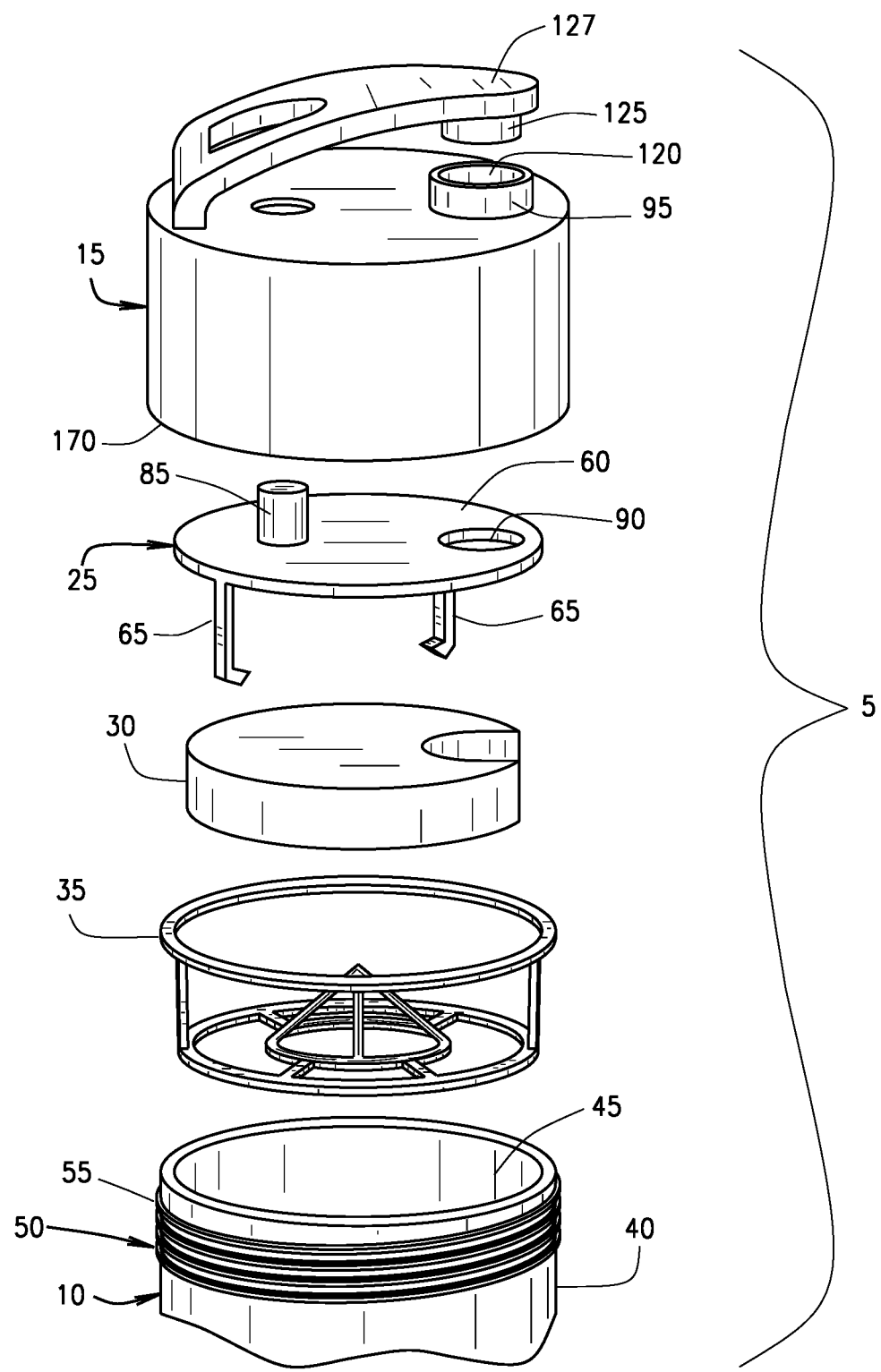
F I G . 2

CONTAINER CAP ASSEMBLY

CROSS-REFERENCE TO RELATED APPLICATIONS

This application claims the benefit of U.S. Provisional Application No. 62/478,770, filed Mar. 30, 2017, which is hereby incorporated by reference in its entirety.

FIELD OF THE INVENTION

The present disclosure relates to a container cap assembly, and more particularly to a container cap assembly for selectively holding and dispensing a substance into a liquid within an associated bottle.

BACKGROUND OF THE INVENTION

Millions of people exercise every day to maintain a healthy body, decreasing their risk of heart disease and stroke. Exercise can also lower blood pressure, increase levels of good cholesterol, improve blood circulation, prevent bone loss, and increase energy levels. People also exercise to simply relieve stress, anxiety, depression, or anger. However, in order to have the energy to be able to exercise and to improve one's body, a person requires both exercise and a proper diet, which includes protein.

Protein is required for building and increasing muscle strength, and also helps repair any internal or external damage. Protein is used for almost everything—transporting molecules, DNA replication, catalyzing metabolic reactions, and responding to stimuli. While everyone requires protein in their diet, adults who exercise require a higher amount of protein compared to sedentary adults. Studies have also shown that ingesting protein soon after a workout is more effective in repairing and building muscle than if protein is ingested later. Therefore, it would be beneficial for adults to have a convenient method of being able to quickly ingest protein. Some adults quickly ingest protein through protein shakes. Protein shakes, often sold in powder or liquid form for mixing with water, allow a person to create an instant protein drink at the gym, at work, outside, or anywhere else. Protein shakes are also often more affordable when compared to the cost of meat, fish, poultry, dairy, or vegetables a person would need to consume for the same amount of protein. Many protein mixes also contain other ingredients useful in building muscle, or the like.

While people can simply pour protein powder into a cup and mix it into a liquid with a spoon, this is not always an easy or convenient method. Not only does a person have to remember to bring something to mix the protein shake, a person still has to measure out the correct amount of protein powder to ensure the protein powder is in the right ratio to the liquid. Furthermore, mixing the protein shake with a utensil often leaves lumps of protein powder floating within the protein powder shake.

In order to prevent lumps of protein powder in a protein shake, and removing the necessity of bringing a utensil to mix the protein shake, some people use a shaker cup instead. A shaker cup allows a person to mix a protein shake to a smooth consistency and further eliminates the need to bring an extra utensil to mix the protein shake. However, a person using the shaker cup does not have the option of deciding when to mix the protein powder into the liquid. Instead, once the powder is added to the shaker cup, the provisional bell cannot be unrung. The user is not able to place the protein powder within the shaker cup, without mixing it, and still be able to drink the unmixed liquid (e.g. water).

Therefore, it would be desirable to provide an innovative storage and delivery system that allows user to decide when to mix a powder (e.g., protein powder) with a liquid (e.g., water), and still be able to drink the unmixed liquid.

SUMMARY OF THE INVENTION

A shaker cup with a container cap assembly is provided that allows a user to store a mix within the shaker cup, and choose whether and when to dispense a mix, which may be a powder, a liquid, or other form, into the liquid in the shaker cup. More particularly, when the shaker cup has been assembled, the mix, within a pod, may be stored within the shaker cup so that the user may choose when to open the pod and blend the mix with the liquid without have to open the shaker cup. Additionally, even when the pod is stored within the shaker cup, the liquid within the bottle is in fluid communication with a spout of a lid so that the user may drink the unmixed liquid from the shaker cup. Thus, the user may drink the unmixed liquid contained within the bottle, with the pod stored in the shaker cup, or may blend the mix with the liquid without disassembling the shaker cup.

The shaker cup includes the lid, a pod holder, the pod, a screen, and the bottle. The pod may be placed within the pod holder, and the pod holder then inserted into the lid. The pod holder may be a component of the lid in one example embodiment. The pod holder holds the pod within the lid of the shaker cup and the pod may extend down into the bottle. The pod holder may include a button or other structure, which forces the pod downwards onto the screen, puncturing the pod and releasing its powdered contents to the liquid within the bottle. Thus, the user does not have to disassemble the shaker cup to release and blend the mix with the liquid. Other mechanisms for opening the pod are al so envisioned.

After the pod has been used, the user may remove the lid from the bottle, and also remove the pod holder from the within the lid. The user may therefore place another pod within the pod holder for future use.

Various other aspects, objects, features and embodiments of the present disclosure are disclosed with reference to the following specification, including the drawings.

Notwithstanding the above examples, the present disclosure is intended to encompass a variety of other embodiments including for example other embodiments as are described in further detail below as well as other embodiments that are within the scope of the claims set forth herein.

BRIEF DESCRIPTION OF THE DRAWINGS

For a better understanding of the various embodiments of the present invention, reference may be made to the accompanying drawings in which:

FIG. 2 is an exploded perspective view of a container cap assembly and a bottle;

Figure 1:
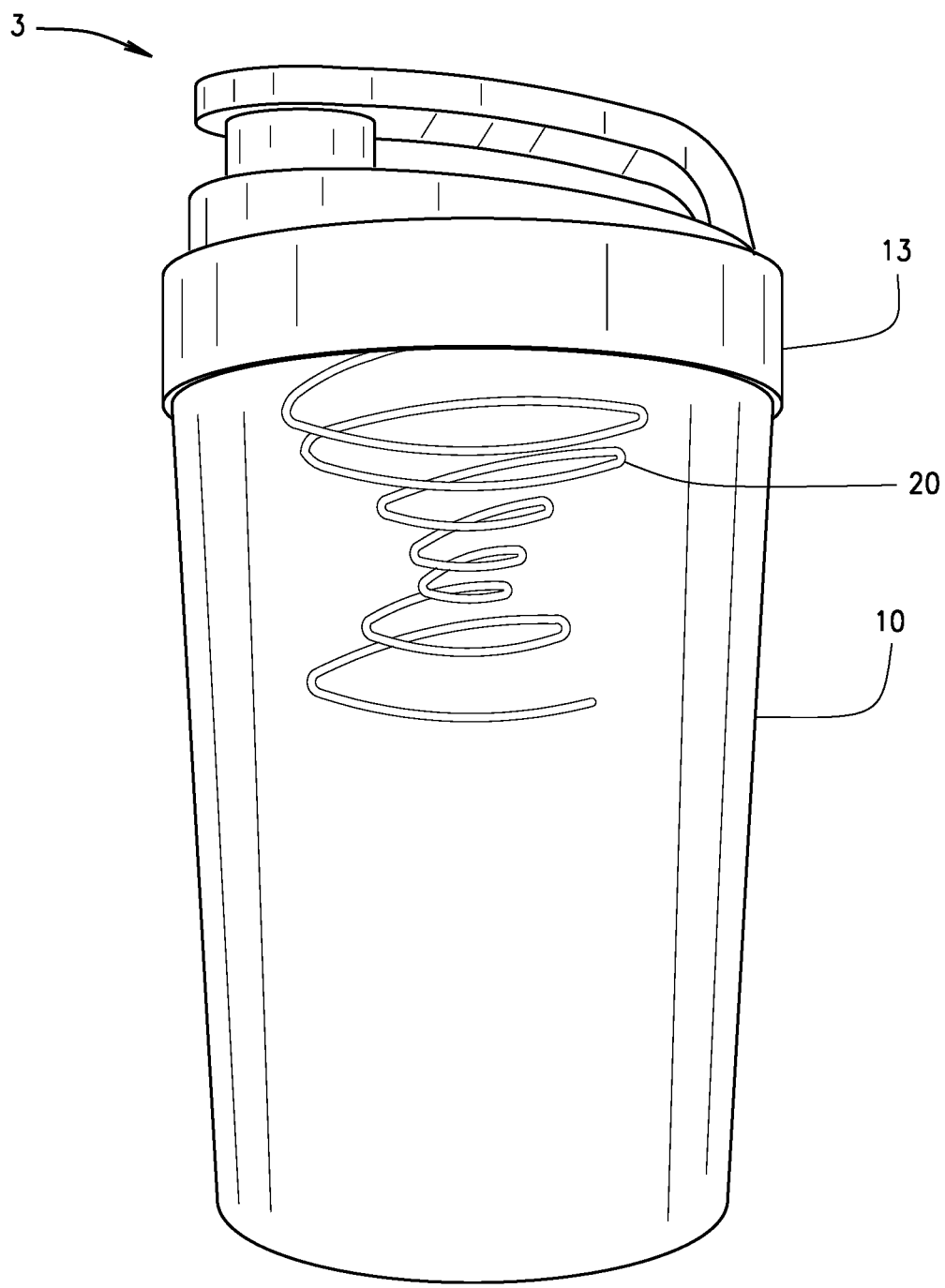
FIG. 1 is a perspective view of a typical shaker cup embodiment as known in the prior art.

While the disclosure is susceptible to various modifications and alternative forms, specific embodiments thereof are shown by way of example in the drawings and will herein be described in detail. It should be understood, however, that the drawings and detailed description presented herein are not intended to limit the disclosure to the particular embodiment disclosed, but on the contrary, the intention is to cover all modifications, equivalents, and alternatives falling within the spirit and scope of the present disclosure.

DETAILED DESCRIPTION OF THE DRAWINGS

The invention will now be described with reference to the drawing figures, in which like reference numerals refer to like parts throughout. For purposes of clarity in illustrating the characteristics of the present invention, proportional relationships of the elements have not necessarily been maintained in the drawing figures.

Turning to FIG. 1, a shaker cup 3, as known in the prior art, is provided. The shaker cup 3, in many ways, is like many of those that are used in the exercise industry to blend a mix with a liquid within a container 10. In a typical shaker cup 3, as known in the prior art, the mix is added to the container 10. Non-inclusive examples of the mix may be protein powder, nutritional supplement powder, or powder flavors. After the mix is added to the container 10, the liquid can be added to the container 10. Non-inclusive examples of the liquid may be water, milk, almond milk, or juices. Once both the mix and liquid have been added to the container 10, the lid 13 of the shaker cup 3 may be mated to the container 10. The lid 13 and container 10 creates a leak-proof seal, where the user can then shake the shaker cup 3 to blend the mix with the liquid. The shaker cup 3 also includes a mixer 20 to help blend the mix and eliminate any lumps within the shake. The shaker cup 3 may be made out of a variety of materials including plastic, glass, steel, or aluminum.

In the present invention, the shaker cup 5 enables a person to choose whether and when to blend the mix with the liquid, without requiring a person to add or remove anything to or from the shaker cup 5. As seen in FIG. 2, the shaker cup 5 includes the lid 15, a pod holder 25, a pod 30, a screen 35, and the container 10 (described in more detail below). Once the shaker cup 5 has been assembled, the shape of the pod 30, lid aperture, and spout create a channel that allows fluid communication between all the components of the shaker cup 5, and further allows the user to drink from the container 10 without the liquid being blocked by any of the components of the shaker cup 5. The container 10 can be a bottle, cup, or any other shape and size capable of holding liquid and further includes an upper container end 40 and a lower container end (not shown), thereby creating a liquid containing reservoir 45. The bottle further includes an annular ring or neck 50 located and positioned at the upper container end 40. The annular ring 50 includes a first set of threads 55, which extend radially outward from an outer surface of the annular ring 50.

The pod 30, which contains the mix (and will also be described in more detail hereinafter), is preferably placed in the shaker cup 5 and held in place, within the shaker cup 5, by the pod holder 25. The pod holder 25 includes a pod holder mechanism for selectively retaining the pod 30, with a first position and a second position. The first position of the pod holder 25 allows the pod holder 25 to retain the pod 30 within, while the second position of the pod holder 25 does not allow the pod holder 25 to retain the pod 30.

Figure 3A:
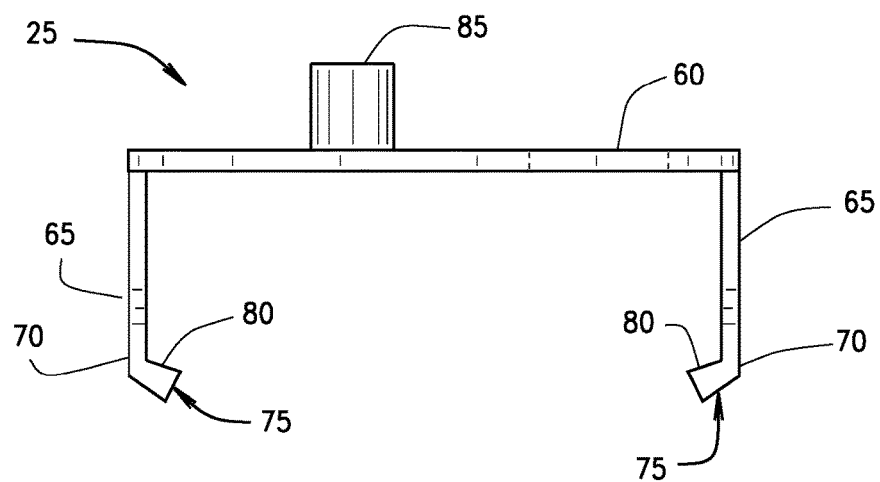
FIG. 3A is a cross sectional view of the pod holder of FIG. 2 in a first position taken along line 2-2.
Figure 3B:
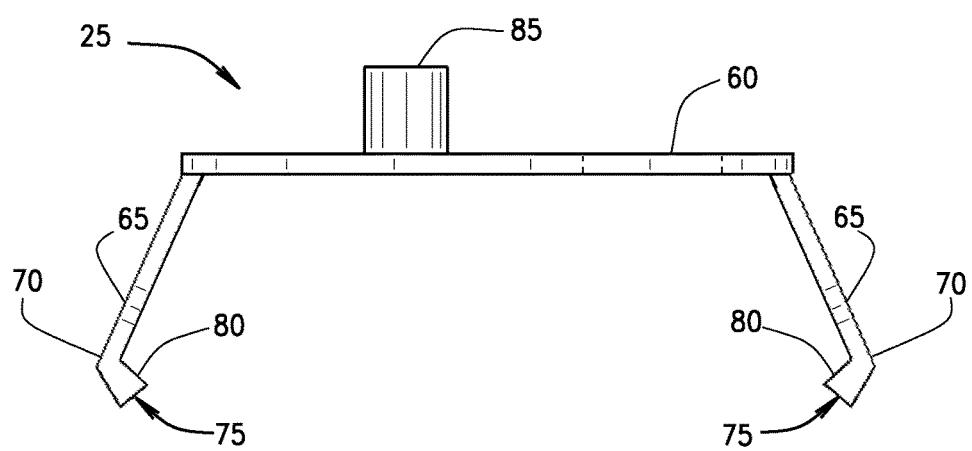
FIG. 3B is a cross sectional view of the pod holder of FIG. 2 in a second position taken along line 2-2.

One example embodiment of the pod holder mechanism can be seen in FIGS. 2 and 3 where the pod holder 25 includes an upper pod holder member 60 that fits under the lid. The pod holder member 60 is preferably circular and substantially planar, with a diameter slightly smaller than the diameter of the lid 15. Therefore, the lid 15 may be placed over the pod holder 25 when the shaker cup 5 is assembled although any suitable shape is envisioned. The pod holder 25 further includes at least two arms 65, which extend radially outward and downward from the upper pod holder member 60, so that the distance between lower ends 70 of the arms is preferably larger than the diameter of the upper pod holder member 60 and the annular ring 50. The arms 65 preferably also extend downwardly slightly more the height of the pod 30, so that the pod 30 may be placed within the pod holder 25 (which will be explained in more detail below). The lower ends 70 of the arms 65 each include a protrusion 75 that extends inwards towards the center of the upper pod holder member 60. In one embodiment, the protrusion 75 may be in the shape of a right triangle wherein the right angle of the triangle is closer to the center of the upper pod holder member 60 and also creates an upper surface 80. The pod 30 may therefore be placed between the upper pod holder member 60 and the protrusion 75, so that the pod abuts and rests on the upper surface 80. Thus, once the pod 30 is placed within the pod holder 25 and the pod holder 25 placed within the lid 15, the pod holder 25 mechanism is in the first position. Once the pod holder 25 is removed from within the lid 15, the pod holder is in the second position; therefore, the pod 30 is released from within the pod holder 25.

The pod holder 25 further includes an actuating mechanism for selectively moving the pod holder 25 between the first position and the second position, therefore also moving pod 30 into a position where the mix within pod 30 is released. In an example embodiment of the actuating mechanism, the pod holder may further include a button 85. The button 85 is preferably located and positioned at the center of the upper pod holder member 60. While the button 85 may have any shape and size, the button 85 is preferably substantially planar and easy for a user to depress. When the button 85 is depressed, the pod 30 is pushed onto the screen 35, which will be described in more detail hereinafter. As will also be explained hereinafter, the pod holder 25 also includes a pod holder aperture 90 so that the liquid from the container 10 may be in liquid communication with a spout 95 of the lid 15.

Figure 4:
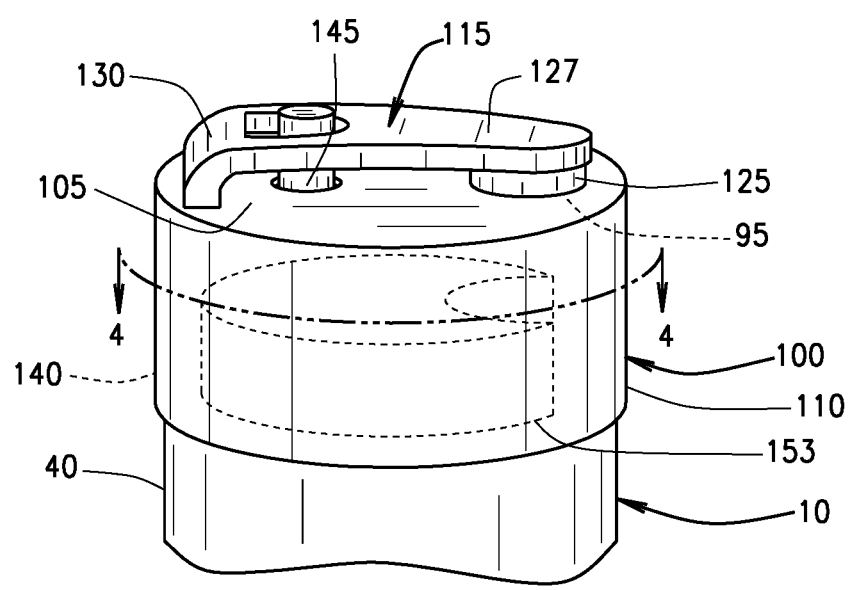
FIG. 4. is a perspective view of a lid of the container cap assembly of FIG. 2.

Once the pod 30 has been placed within the pod holder 25, the pod holder 25 may be inserted into the lid 15, as seen in FIG. 4. The lid 15 may include a lid main section 100, which is preferably a cylinder that has a larger diameter than both the pod holder 25 and the pod 30 so that both the pod holder 25 and the pod 30 may fit within the lid main section 100. The lid main section 100 includes a lid upper surface 105 and a side 110, which extends the around the circumference and downwards from lid upper surface 105. The lid upper surface 105 is preferably substantially planar, with both the spout 95 and a hinge 115 protruding and extending from the lid upper surface 105. Spout 95 is preferably an annular ring extending from the lid upper surface 105. The lid upper surface 105 includes a spout aperture 120 embodied as a through-hole through the lid upper surface 105, located and positioned within spout 95, and allows for fluid communication from the reservoir 45 out of container 10 through the spout 95. The lid upper surface 105 may further include the hinge 115. The hinge 115 includes a plug 125 at a first hinge end 127, where the plug 125 is shaped to fit and mate with spout 95 and forms a leak-proof seal so that the liquid from the container 10 does not spill. The plug 125 may be placed in an open position, where the shaker cup 5 may be tilted to dispense the liquid from the container 10. Alternatively, the plug 125 may be placed in a closed positioned, where the plug 125 has engaged and mated with the spout 95. Therefore, when the plug 125 is in a closed position, the plug 125 prevents the liquid within the container 10 from being dispensed. The hinge 115 is connected to the lid upper surface 105 at a second hinge end 130. The lid main section 100 may further include a first set of threads 140 (not shown), which extend radially inwardly from an inner surface of the lid 15, and is used to selectively engage the container 10 (which will be described in greater detail hereinafter).

When the pod holder 25 is inserted into the lid 15, and more specifically into the lid main section 100, the arms 65 of the pod holder are deflected inwardly by the side 110 of the lid main section 100, thus holding the pod 30 within the pod holder 25. If the user wishes to remove the pod 30 from the pod holder 25, the pod holder 25 may be removed from within the lid 15, thereby allowing the arms 65 to resiliently spring outwardly and release the pod 30. The annular ring 50 may also serve the same purpose of deflecting the arms 65 inwardly instead of or in addition to the side 110 of the lid main section 100. Other selective release mechanisms are also envisioned.

The lid 15 includes a lid aperture 145, which has a slightly larger diameter than the button 85. The button 85, therefore, is able extend into and through the lid aperture 145. The button 85 is able to be depressed and is preferably biased towards a position in which the pod 30 is held above the screen 35. In one embodiment, a spring (not shown) is used as the biasing mechanism to return the button 85 to its un-pushed state. The button 85 and lid aperture 145 preferably fit closely enough and/or may include an O-ring, or the like, in-between the button 85 and lid aperture 145 to prevent the liquid within the container 10 from leaking between the button 85 and lid aperture 145.

Figure 5:
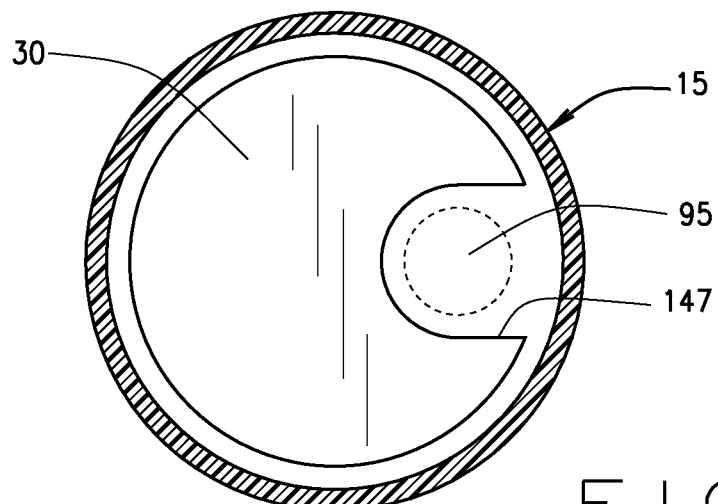
FIG. 5 is a cross sectional view of the lid with a pod of FIGS. 2 and 4, taken along line 4-4.

In one embodiment, the pod 30 preferably has a cut-out 147 in the shape of a crescent, as seen in FIG. 5. The crescent shape of the pod 30 prevents the pod 30 from blocking the liquid from the container 10, thereby allowing the liquid from the bottle to reach the spout 95 and also permitting the user of the shaker cup 5 to be able to drink from the shaker cup 5 with the pod 30 still inside the lid 15. In other embodiments, the pod 30 may be various shapes and sizes, but preferably does not prevent the liquid from being poured from the spout 95 of the lid 15.

While the user of the shaker cup 5 may drink unmixed liquid from the bottle and the mix, unblended and inside of the pod 30, the user may also choose to blend the mix with the liquid. As stated above, the pod 30 contains the mix which may be combined with the liquid in the reservoir 45. The pod is preferably a disposable container containing the powder. The pod 30 is preferably substantially made out of plastic or the like, with a foil sheet sealing the powder within the plastic container. The foil portion of the pod 30 is placed so that it is facing downwards, adjacent to the screen 35. However, the pod 30 may be any material as long as the pod 30 may be punctured or otherwise opened by the screen 35, which will be explained in more detail below.

Figure 6:
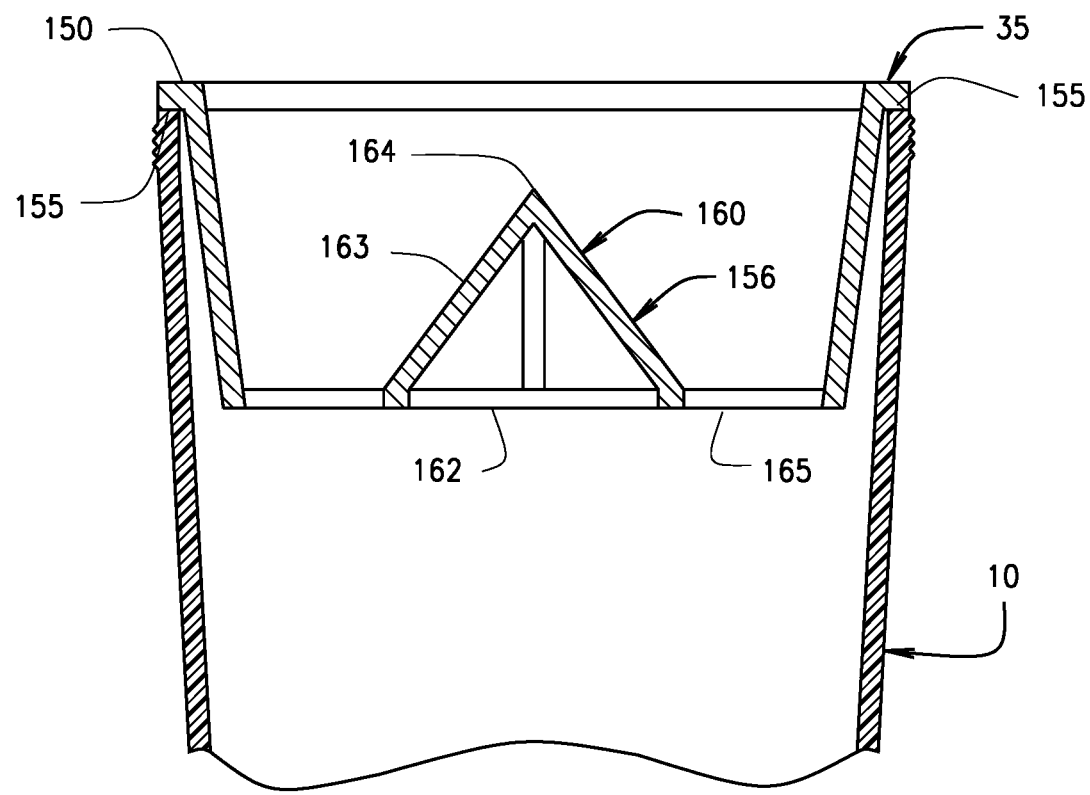
FIG. 6 is a cross sectional view of a screen and the bottle of FIG. 2.
Figure 7:
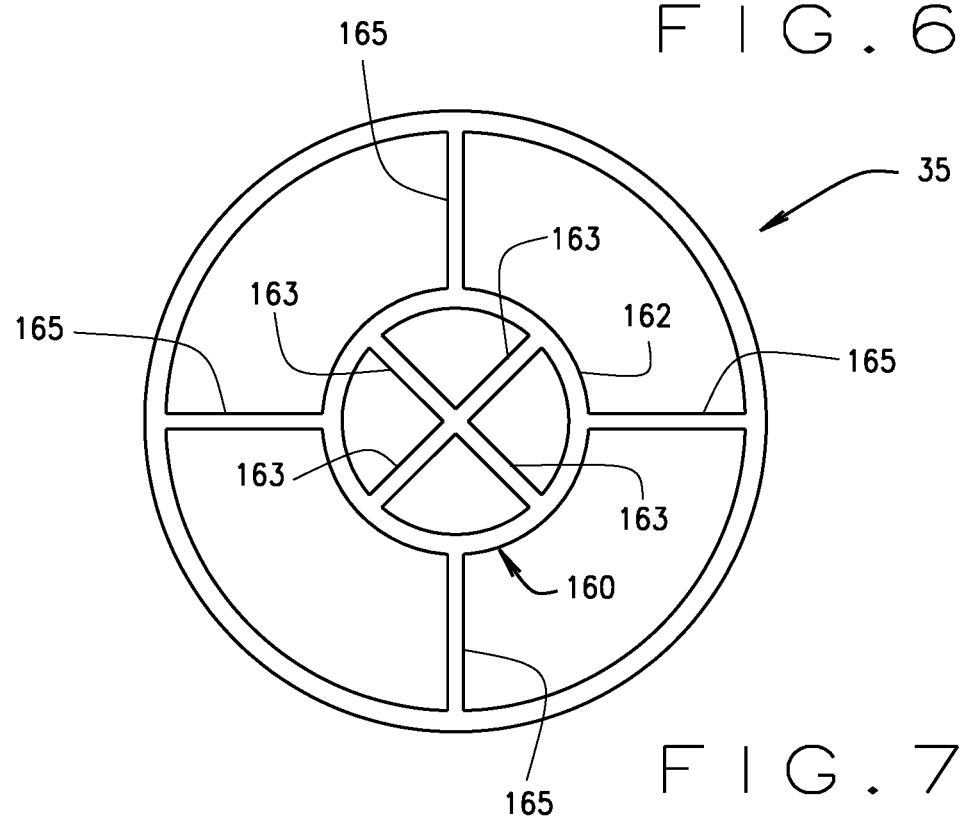
FIG. 7 is a top plan view of the screen of FIG. 6.

In one embodiment, the screen 35 includes a flange 150, which is preferably an annular ring with a diameter larger than the container 10. The flange 150, and thereby the screen 35, may therefore sit on top of the container rim 155 of the container 10, as seen in FIG. 6. The screen 35 includes a projection 156 capable of puncturing the underside 153 of the pod 30. In one embodiment, the projection may be a cone 160 preferably located and positioned substantially in the center of the screen 35, illustrated in FIGS. 6 and 7. The cone 160 preferably is a cone annular ring 162 with four arms 163 extending upwards and towards the center of the annular ring until they meet in a point 164, creating a cone-like shape. In some embodiments, screen 35 may consist entirely of the cone 160; in other embodiments, the screen 35 may further include at least two supporting arms 165 extending inwards towards the center of the screen, supporting the cone 160 in the center. In still further embodiments, screen 35 may be other shapes and sizes, as long as it is able to puncture pod 30 when the button 85 is depressed and liquid is able to travel through the screen 35. The pod 30 is inserted into the pod holder 25, whereas the user may push the button 85 to push the pod 30 onto the screen 35, thereby breaking open the pod 30 and releasing the powder into the liquid.

In order to use the shaker cup 5, the user must first assemble the shaker cup 5. The user may place the liquid inside of the reservoir 45 of the container 10. The screen 35 is placed on the container rim 155, so it is adjacent and abuts the container rim 155 of the container 10. The pod 30 is then inserted into the pod holder 25, which is then placed into the lid 15 so that the button 85 extends into and through the lid aperture 145, thereby deflecting the arms 65 inwardly and holding the pod 30 within the pod holder 25. The lid 15 is then placed onto the container 10, so that the lid 15 abuts the container 10. The first set of threads 55, extending outwardly from the outer surface of the annular ring 50, and the second set of threads 166, extending inwardly from an inner surface of the lid 15, allow the lid 15 and the container 10 to selectively each other through a threaded engagement known and understood in the art. In alternative embodiments, the lid 15 and the container 10 may selectively engage each other through a friction fit, or any other method known in the art. When the lid 15 and the container 10 are ready to be engaged, the lid 15 is positioned over the container 10, so that the annular ring 50 of the container 10 is inserted into the lid 15 and the lower rim 170 of the lid 15 rests on and abuts the container 10, while the container rim 155 of the container 10 abuts the lid upper surface 105. The lid 15 and the container 10 may then engage through a threaded engagement with the lid 15 being turned clockwise to engage the lid 15 to the container 10. Likewise, the lid 15 may be turned counterclockwise to disengage the lid 15 with the container 10. Other methods of engaging the lid 15 with the container 10 are envisioned and foreseeable.

Once the shaker cup 5 has been assembled, the user may choose when to blend the mix within the pod 30 with the liquid. The user may use tilt the shaker cup 5 to dispense the liquid within the container 10, if the plug 125 is in an open position, thereby allowing the user to drink the liquid. Additionally, the user may choose to blend the mix with the liquid by depressing the button 85, so that the pod 30 is pushed onto the screen 35. The screen 35 punctures the pod 30, thereby allowing the mix within to fall into the liquid. The user can then shake the shaker cup 5 to blend the mix into the liquid, where the screen 35 enables the mix to blend more quickly and also breaks up any lumps that might have formed.

From the foregoing, it will be seen that the various embodiments of the present invention are well adapted to attain all the objectives and advantages hereinabove set forth together with still other advantages which are obvious and which are inherent to the present structures. It will be understood that certain features and sub-combinations of the present embodiments are of utility and may be employed without reference to other features and sub-combinations. Since many possible embodiments of the present invention may be made without departing from the spirit and scope of the present invention, it is also to be understood that all disclosures herein set forth or illustrated in the accompanying drawings are to be interpreted as illustrative only and not limiting. The various constructions described above and illustrated in the drawings are presented by way of example only and are not intended to limit the concepts, principles and scope of the present invention.

Many changes, modifications, variations and other uses and applications of the present invention will, however, become apparent to those skilled in the art after considering the specification and the accompanying drawings. All such changes, modifications, variations and other uses and applications which do not depart from the spirit and scope of the invention are deemed to be covered by the invention which is limited only by the claims which follow.

What is claimed is:

1. A shaker cup for allowing a user to choose when to blend a mix within a pod with a liquid, the shaker cup comprising:
    a container including a reservoir therein, the reservoir being capable of holding a liquid;
    a lid including a spout;
    a crescent-shaped pod sized and shaped to allow for the liquid to flow from the reservoir around the pod and through the spout;
    a pod holder including a pod holder mechanism for selectively retaining the pod, the pod holder having a first position and a second position, the pod holder further including an actuating mechanism for selectively moving the pod holder between the first position and the second position;
    the container being selectively engageable with the lid.

2. The shaker cup of claim 1, wherein the lid includes a plug being sized and shaped to fit the spout.

3. The shaker cup of claim 2, wherein the lid further includes a hinge, the plug being connected to the lid by the hinge.

4. The shaker cup of claim 1, wherein the lid and container are selectively engageable with one another through a threaded engagement mechanism.

5. A shaker cup for allowing a user to choose when to blend a mix within a pod with a liquid, the shaker cup comprising:
    a container includes a reservoir therein, the reservoir being capable of holding a liquid;
    a lid includes a spout,
    a pod sized and shaped to allow for the liquid to flow from the reservoir around the pod and through the spout;
    a pod holder includes a pod holder mechanism for selectively retaining the pod, the pod holder mechanism includes an upper pod holder member having at least two arms extending radially outward and downward toward the reservoir of the container upon selective assembly of the lid with the container, the pod holder has a first position and a second position, the pod holder further includes an actuating mechanism for selectively moving the pod holder between the first position and the second position; and
    the container being selectively engageable with the lid.

6. The shaker cup of claim 5, wherein the arms each have a radially inward protrusion with an upper surface, wherein the pod is positioned under the upper pod holder member and rests on the upper surface of the protrusion of the arms.

7. The shaker cup of claim 5, wherein the pod holder mechanism includes a button for moving the pod holder between the first position and the second position.

8. The shaker cup of claim 7, wherein the button extends into and through a lid aperture located and positioned within the lid.

9. The shaker cup of claim 5, wherein the shaker cup includes a screen.

10. The shaker cup of claim 9, wherein the screen includes a projection for selectively puncturing an underside of the pod.

11. The shaker cup of claim 10, wherein the projection is cone-shaped.

12. The shaker cup of claim 10, wherein the second position of the pod holder causes the screen to puncture the underside of the pod.

13. The shaker cup of claim 9, wherein the screen includes a flange, the flange abutting and resting on a container rim, the flange located and positioned in-between the container rim and an upper surface of the lid.

14. The shaker cup of claim 9, wherein the screen extends into the reservoir of the container.

15. A shaker cup for allowing a user to choose when to blend a mix within a pod with a liquid, the shaker cup comprising:
    a container including a reservoir therein, the reservoir being capable of holding a liquid, the container further including a container rim at an upper portion of the container;
    a lid including a lid aperture, a spout, and a plug selectively engageable with the spout, the plug being connected to the lid by a hinge;
    a pod having a cut-out, wherein the cut-out allows for the liquid to flow from the reservoir around the pod and through the spout;
    a pod holder including an upper pod holder member having at least two arms extending radially outward and downward toward the reservoir of the container upon selective assembly of the lid with the container, the arms each have a radially inward protrusion with an upper surface, wherein the pod is positioned under the upper pod holder member and rests on the upper surface of the protrusion of the arms, the upper pod holder member further including a button;
    the pod holder being engageable with an underside of the lid, the button extending into and through the lid aperture, wherein a side of at least one of the container and the lid compress the arms of the pod holder inwards to secure the pod within the pod holder;
    a screen having a projection for selectively puncturing an underside of the pod, the screen further including a flange, the flange abutting and resting on the container rim and the screen extending into the reservoir of the container;
    the container selectively engages the lid, the flange of the screen located and positioned in-between the container rim and the lid upper surface.

16. The shaker cup of claim 15, wherein the screen includes a cone-shaped projection.

17. The shaker cup of claim 15, wherein the cut-out of the pod is crescent-shaped.

18. The shaker cup of claim 15, wherein the at least two arms of the upper pod holding member consists of two arms.

19. The shaker cup of claim 15, wherein the lid and the container are selectively engageable with one another through a threaded engagement mechanism.

\* \* \* \* \*